United States Patent
Dureau

(10) Patent No.: US 11,363,348 B2
(45) Date of Patent: *Jun. 14, 2022

(54) MANAGING LIFECYCLES OF TELEVISION GADGETS AND APPLICATIONS

(71) Applicant: Google LLC, Mountain View, CA (US)

(72) Inventor: Vincent Dureau, Palo Alto, CA (US)

(73) Assignee: Google LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/233,971

(22) Filed: Apr. 19, 2021

(65) Prior Publication Data

US 2021/0243508 A1 Aug. 5, 2021

Related U.S. Application Data

(63) Continuation of application No. 16/390,574, filed on Apr. 22, 2019, now Pat. No. 10,986,420, which is a
(Continued)

(51) Int. Cl.
*H04N 7/10* (2006.01)
*H04N 21/81* (2011.01)
(Continued)

(52) U.S. Cl.
CPC ........ *H04N 21/8126* (2013.01); *H04H 60/72* (2013.01); *H04H 60/74* (2013.01);
(Continued)

(58) Field of Classification Search
CPC ............. H04N 21/488; H04N 21/4314; H04N 21/482; H04N 21/8455
(Continued)

(56) References Cited

U.S. PATENT DOCUMENTS

| 2001/0001160 A1 | 5/2001 | Shoff et al. |
| 2002/0147984 A1 | 10/2002 | Tomsen et al. |

(Continued)

FOREIGN PATENT DOCUMENTS

| KR | 20030062585 | 7/2003 |
| KR | 20090123245 | 12/2009 |
| WO | WO 2007004371 | 1/2007 |

OTHER PUBLICATIONS

Gigaom.com, "Samsung See-N-Search: When New & Old TeeVees Come Together", last accessed May 9, 2011, available at http://gigaom.com/video/samsung-see-n-search-when-new-old-tee-vees-come-together, pp. 1-7.

(Continued)

*Primary Examiner* — Jivka A Rabovianski
(74) *Attorney, Agent, or Firm* — Byrne Poh LLP

(57) ABSTRACT

The subject matter of this specification can be embodied in, among other things, a method that includes identifying metadata related to television programming. The method further includes sending search requests that include the identified metadata to a search system for selecting at least one portable program module. The method further includes in response to a first one of the search requests, receiving first search results from the search system that identify the selected portable program module and outputting a representation of the selected portable program module to a display device for presentation concurrently with the television programming. The method further includes in response to a second one of the search requests, receiving second search results from the search system that no longer identify the selected portable program module and ceasing the output of the representation of the selected portable program module.

19 Claims, 5 Drawing Sheets

Related U.S. Application Data continuation of application No. 15/728,274, filed on Oct. 9, 2017, now Pat. No. 10,271,108, which is a continuation of application No. 14/868,237, filed on Sep. 28, 2015, now Pat. No. 9,788,081, which is a continuation of application No. 13/104,593, filed on May 10, 2011, now Pat. No. 9,148,238.

(60) Provisional application No. 61/346,286, filed on May 19, 2010.

(51) Int. Cl.
  *H04H 60/74* (2008.01)
  *H04H 60/72* (2008.01)
  *H04N 21/431* (2011.01)

(52) U.S. Cl.
  CPC ....... *H04N 21/431* (2013.01); *H04N 21/8173* (2013.01); *H04N 21/8186* (2013.01); *H04H 2201/40* (2013.01)

(58) Field of Classification Search
  USPC ........................................ 725/34, 40, 46, 52
  See application file for complete search history.

(56) References Cited

U.S. PATENT DOCUMENTS

| | | | |
|---|---|---|---|
| 2003/0070183 A1 | 4/2003 | Pierre et al. | |
| 2006/0095543 A1 | 5/2006 | Ito et al. | |
| 2006/0167896 A1 | 7/2006 | Kapur et al. | |
| 2007/0214488 A1 | 9/2007 | Nguyen et al. | |
| 2008/0046928 A1* | 2/2008 | Poling | H04N 21/482 725/40 |
| 2008/0066137 A1 | 3/2008 | Cox et al. | |
| 2008/0244681 A1 | 10/2008 | Gossweiler et al. | |
| 2008/0271080 A1 | 10/2008 | Gossweiler et al. | |
| 2008/0313146 A1* | 12/2008 | Wong | G06F 16/7844 |
| 2009/0247192 A1 | 10/2009 | Gupta et al. | |
| 2010/0242077 A1 | 9/2010 | Kota et al. | |
| 2010/0312608 A1 | 12/2010 | Shan et al. | |
| 2011/0154399 A1 | 6/2011 | Jin et al. | |

OTHER PUBLICATIONS

International Search Report and Written Opinion dated Feb. 9, 2012 in International Patent Application No. PCT/US2011/035790.
Notice of Allowance dated May 22, 2015 in U.S. Appl. No. 13/104,593.
Notice of Allowance dated Jun. 8, 2017 in U.S. Appl. No. 14/868,237.
Notice of Allowance dated Dec. 12, 2018 in U.S. Appl. No. 15/728,274.
Notice of Allowance dated Dec. 18, 2020 in U.S. Appl. No. 16/390,574.
Office Action dated Feb. 12, 2014 in U.S. Appl. No. 13/104,593.
Office Action dated May 6, 2020 in U.S. Appl. No. 16/390,574.
Office Action dated Jun. 4, 2018 in U.S. Appl. No. 15/728,274.
Office Action dated Jul. 7, 2016 in U.S. Appl. No. 14/868,237.
Office Action dated Jul. 17, 2013 in U.S. Appl. No. 13/104,593.
Office Action dated Sep. 19, 2014 in U.S. Appl. No. 13/104,593.
Office Action dated Sep. 24, 2020 in U.S. Appl. No. 16/390,574.
Office Action dated Dec. 21, 2012 in U.S. Appl. No. 13/104,593.
Office Action dated Dec. 28, 2016 in U.S. Appl. No. 14/868,237.
Open TV, Inc., "OpenTV H20 1.2 Technical White Paper", 2004, pp. 1-14.
OpenTV, Inc., "OpenTV Notify Technical White Paper", 2004, pp. 1-16.
OpenTV.com, "OpenTV H20 1.0 Product Sheet", last accessed Oct. 13, 2009, available at: http://opentv.com/products/servicemgmt.htm, pp. 1-4.
OpenTV.com, "OpenTV Account", last accessed Oct. 13, 2009, available at: http://opentv.com/products/servicemgmt.htm, pp. 1-2.
OpenTV.Com, "OpenTV Streamer", last accessed Oct. 13, 2009, available at http://opentv.com/products/servicemgmt.htm>, pp. 1-2.

\* cited by examiner

MANAGING LIFECYCLES OF TELEVISION GADGETS AND APPLICATIONS

CROSS-REFERENCE TO RELATED APPLICATIONS

This application is a continuation of U.S. patent application Ser. No. 16/390,574, filed Apr. 22, 2019, which is a continuation of U.S. patent application Ser. No. 15/728,274, filed Oct. 9, 2017, which is a continuation of U.S. patent application Ser. No. 14/868,237, filed Sep. 28, 2015, which is a continuation of U.S. patent application Ser. No. 13/104,593, filed May 10, 2011, which claims the benefit of U.S. Provisional Patent Application No. 61/346,286, filed May 19, 2010, each of which is hereby incorporated by reference herein in its entirety.

TECHNICAL FIELD

This instant specification relates to managing lifecycles of television based gadgets and applications.

BACKGROUND

Many people like to multi-task while watching television. In some cases, a person may like to surf the web or chat with friends while watching television. In some cases, a person may play a game while watching television. These activities sometimes draw viewers away from television to their personal computer, cell phone, game console, or other network connected device.

Sometimes, computer users interact with gadgets (also called widgets) while surfing the web. Gadgets are generally written in a web markup language, such as Hypertext Markup Language (HTML) or Extensible Hypertext Markup Language (XHTML). Typically, gadgets can be run successfully on various types of devices, as long as those devices can execute the relevant mark-up language. These gadgets generally include or make use of a web programming or scripting language, such as JavaScript. Gadgets are becoming commonplace in web pages, such as social networking sites and customized home pages. Gadgets are also commonplace in desktop applications, such as desktop sidebar applications.

Some enhanced television systems, such as WINK, OPENTV, ADVANCED TELEVISION ENHANCEMENT FORUM (ATVEF), YAHOO WIDGETS, and OPEN-CABLE APPLICATION PLATFORM (OCAP), can display gadgets or other Internet content on top of television content. In some cases these systems use triggers built into the audio/video signal to link particular television shows or advertisements with a specific interactive application. These systems can associate an application with a particular point of a particular program.

SUMMARY

In general, this document describes selecting portable program modules, such as gadgets and/or applications, to be combined with television viewing based on the program currently watched and/or the preferences of the viewer. In one aspect, a computer-implemented method for managing a lifecycle of a portable program module includes repeatedly identifying metadata related to television programming being presented on a display device. The method further includes repeatedly sending search requests that include the repeatedly identified metadata to a search system for selecting at least one portable program module from among multiple portable program modules. The method further includes in response to a first one of the search requests, receiving first search results from the search system that identify the selected portable program module and outputting a representation of the selected portable program module to the display device for presentation concurrently with the television programming. The method further includes in response to a second one of the search requests, receiving second search results from the search system that no longer identify the selected portable program module and ceasing the output of the representation of the selected portable program module.

Implementations can include any, all, or none of the following features. The method including repeatedly detecting changes in the repeatedly identified metadata, and wherein the second one of the search requests is sent upon detecting a change in the repeatedly identified metadata. The method including between sending the first and second search requests, receiving a user request to change from a first television channel to a second television channel. The first metadata includes an identifier of the first television channel and the second metadata includes an identifier of the second television channel, and wherein repeatedly identifying the metadata includes identifying the first television channel and the second television channel. The first metadata includes a first television program identifier and the second metadata includes a second television program identifier. The method including receiving the selected portable program module from the search system. Selecting the portable program module includes selecting one or more of the portable program modules having a closest match with the first metadata. Selecting the portable program module includes selecting one or more most popular ones of the portable program modules. The selected portable program module includes an advertisement. The first and second metadata include closed captioning information for the television programming. The method including decoding the closed captioning information from the television programming. The first and second metadata can include text or objects recognized from an audio/video signal in the television programming. Outputting the representation of the selected portable program module to the display device includes combining the representation of the selected portable program module with the television programming and outputting the combination to the display device.

In one aspect, a computer program product, encoded on a computer-readable medium, operable to cause one or more processors to perform operations for managing a lifecycle of a portable program module includes repeatedly identifying metadata related to television programming being presented on a display device. The operations further include repeatedly sending search requests that include the repeatedly identified metadata to a search system for selecting at least one portable program module from among multiple portable program modules. The operations further include in response to a first one of the search requests, receiving first search results from the search system that identify the selected portable program module and outputting a representation of the selected portable program module to the display device for presentation concurrently with the television programming. The operations further include in response to a second one of the search requests, receiving second search results from the search system that no longer identify the selected portable program module and ceasing the output of the representation of the selected portable program module.

Implementations can include any, all, or none of the following features. The operations including repeatedly detecting changes in the repeatedly identified metadata, and wherein the second one of the search requests is sent upon detecting a change in the repeatedly identified metadata. The operations including between sending the first and second search requests, receiving a user request to change from a first television channel to a second television channel. The first metadata includes an identifier of the first television channel and the second metadata includes an identifier of the second television channel, and wherein repeatedly identifying the metadata includes identifying the first television channel and the second television channel. The first metadata includes a first television program identifier and the second metadata includes a second television program identifier. The operations including receiving the selected portable program module from the search system. Selecting the portable program module includes selecting one or more of the portable program modules having a closest match with the first metadata. Selecting the portable program module includes selecting one or more most popular ones of the portable program modules. The selected portable program module includes an advertisement. The first and second metadata include closed captioning information for the television programming. The operations including decoding the closed captioning information from the television programming. The first and second metadata can include text or objects recognized from an audio/video signal in the television programming. Outputting the representation of the selected portable program module to the display device includes combining the representation of the selected portable program module with the television programming and outputting the combination to the display device.

In one aspect, a computer-implemented system for managing a lifecycle of a portable program module includes at least one input interface that receives television programming. The system further includes a decoder that repeatedly extracts metadata from the received television programming. The system further includes at least one network interface that sends search requests including the extracted metadata to a search system and, in response, repeatedly receives search results from the search system, including an initial set of search results identifying at least one portable program module. The system further includes a portable program module manager that generates the search requests using the extracted metadata, outputs a representation of the identified portable program module to a display device for presentation concurrently with the television programming, and then ceases the output of the representation of the identified portable program module upon receipt of a subsequent set of search results that no longer identifies the portable program module.

Implementations can include any, all, or none of the following features. The system including at least one output interface to output the portable program module to the display device.

The systems and techniques described here may provide one or more of the following advantages. First, a system can provide for activating portable program modules that will satisfy the multitasking demands of a user on a television display device. Second, a system can provide a life cycle of a television portable program module that is synchronized with the television content. Third, a system can provide a life cycle of a television portable program module that is not vulnerable to broadcasters or operators removing specialized triggers that control the life cycle of the television portable program module.

The details of one or more implementations are set forth in the accompanying drawings and the description below. Other features and advantages will be apparent from the description and drawings, and from the claims.

DETAILED DESCRIPTION

Figure 1:
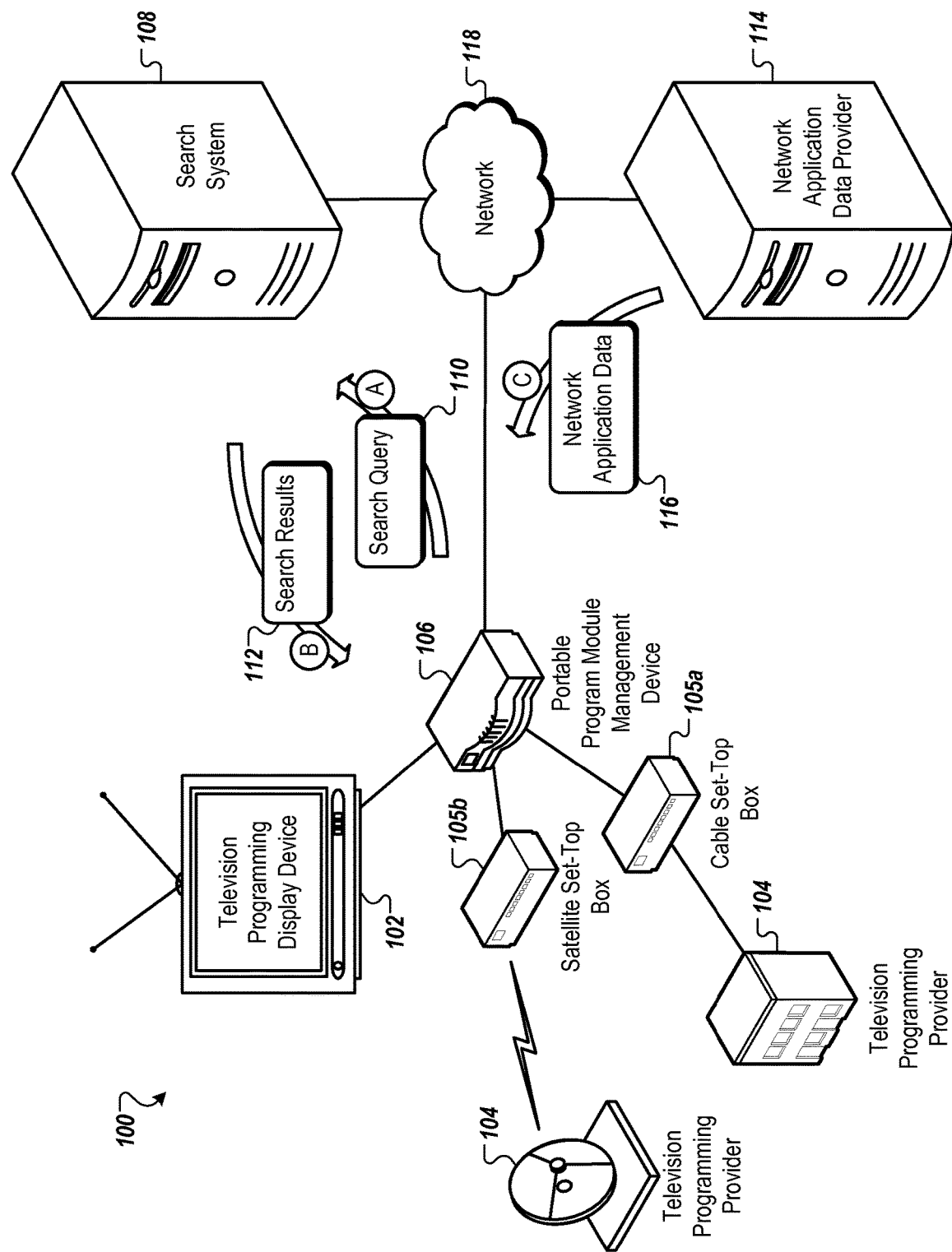
FIG. 1 is a schematic diagram that shows an example of a system for managing the lifecycle of television portable program modules.

FIG. 1 is a schematic diagram that shows an example of a system 100 for managing the lifecycle of television portable program modules. The system 100 is used to present portable program modules to a user. The portable program modules are related to television programming currently being presented to the user. Portable program modules can include, for example, gadgets and/or applications. Gadgets are small interactive applications written in a markup language, such as Hypertext Markup Language (HTML) or Extensible Hypertext Markup Language (XHTML). Gadgets are sometimes also referred to as widgets. In some implementations, a gadget is an iframe HTML element embedded within a container document or web page. In another implementation, a gadget can be a stand-alone web page. Applications are often written using a programming language, such as JAVA or OBJECTIVE C. The written programming is then compiled into an application by a compiler, either sometime prior to running the application, at runtime, or some combination of before runtime and at runtime. Often, the written programming is first compiled into bytecode, which is hardware independent. The bytecode may then be run by a virtual machine, such as the JAVA VIRTUAL MACHINE or the DALVIK VIRTUAL MACHINE.

The visual and audible output of the portable program modules can be shown superimposed on the television programming or, in the case of video, around the television programming. For example, visual output can be shown in the blank space that exists where the aspect ratio of television programming content does not match the aspect ratio of the display device presenting the television content.

In some implementations, the portable program modules are presented on a display device that is separate from the device that presents the television programming. Whether on the same display device or a separate display device, the portable program modules are presented to the user while the television programming content is presented to the user. These portable program modules can provide a user with functionality related to the television content the user is currently viewing, such as chatting with other viewers, access to fan websites, or targeted advertising.

The system 100 includes a television programming display device 102, at least one television programming provider 104, and a portable program module management device 106. The television programming display device 102 is an electronic device used to display television programming. For example, the television programming display device 102 can be a television, computer monitor and speakers, portable video player, or smart phone.

The television programming display device 102 presents television programming provided by the television programming provider 104. The television programming can include, for example, television shows, movies, and/or commercials. The television programming provider 104 sends the television programming to the television programming display device 102 over a wire line connection, such as cable television or television provided by a telephone company, or a wireless connection, such as broadcast television or satellite television.

The portable program module management device 106 monitors the television content being displayed by the television programming display device 102 and displays one or more portable program modules that are related to the television programming currently being displayed to the user. In some implementations, the portable program module management device 106 controls the tuning of television channels and/or playback of other television programming. For example, the user can send a command to the portable program module management device 106 using a wire line or wireless input device, or a button directly on the portable program module management device 106, that requests presentation of a specific channel, navigating up or down a channel, a particular video on demand (VOD), or playback of recorded programming. Wireless input devices can include, for example, an infrared (IR) remote control or BLUETOOTH and WIFI wireless devices, such as a smart phone, mobile computer, or a desktop computer. Wire line input devices can include, for example, computing device connected to the portable program module management device by a local area network (LAN) or the Internet. The portable program module management device 106 receives the request to change the channel and tunes in the requested channel or retrieves the requested video on demand or recorded programming.

Alternatively, the portable program module management device 106 can receive the channel change command and pass the channel change command on to an external tuner, such as through an HDMI connection to a tuner in a cable television set-top box 105*a* or a satellite television set-top box 105*b*. In another example, the portable program module management device 106 can send commands to an external tuner using a wireless connection, such as IR. In another example, the portable program module management device 106 and one or more of the set-top boxes 105*a-b* can communicate using a network, such as a local area network or the Internet. The portable program module management device 106 then receives the video and/or audio for the tuned-in channel from the external tuner.

In another external tuner example, the channel change commands may be sent directly to the external tuner or other external programming device, such as a digital video recorder (DVR). The portable program module management device 106 may then receive the tuned-in channel or other audio/video signal from the external tuner or programming device. The portable program module management device 106 subsequently processes the received programming to identify the metadata. In some implementations, the portable program module management device 106 can monitor a wire line or wireless connection to the external tuner/programming device to identify programming change commands sent to the external tuner/programming device. For example, the portable program module management device 106 can include an IR receiver for monitoring IR commands sent to an external device.

Whether by an internal tuner, an external tuner, programming on demand, or recorded programming, the portable program module management device 106 decodes or identifies metadata for the programming. The metadata is used by the system 100 to select one or more portable program modules related to the content being presented. The metadata may be in-band with the audio/video signal or out-of-band. For example, the portable program module management device 106 can extract in-band closed captioning text, station identification information, or television program identification information from the audio/video. In another example, metadata may be stored out of band with recorded programming, such as a file name or file attributes. In another out of band example, the portable program module management device 106 can retrieve electronic program guide (EPG) data or a transcript for a particular show, channel, and/or time slot from an internal storage at the portable program module management device 106 or an external storage, such as the set-top boxes 105*a-b* or a computing device on the same network as the portable program module management device 106 or on the Internet.

In yet another example of identifying metadata, the portable program module management device 106 or another system can perform speech recognition on the audio to identify text or image recognition on the video to recognize text or objects. For example, a system in communication with the portable program module management device 106 can store identifying information for television programming, such as a name, channel, broadcast date/time, or a portion of the audio/video. The system can also store pre-recognized transcripts of audio and/or pre-recognized text or objects for television programming. The system can compare the stored identifying information to corresponding information for the television programming being presented to the user to determine what television programming the user is currently watching. The system can then retrieve a pre-recognized transcript of the audio and/or pre-recognized text or objects from the video for the identified television programming.

The portable program module management device 106 combines an audio/video representation of the portable program modules with the audio/video signal for the tuned-in channel. For example, the portable program module management device 106 can overlay video for the selected portable program modules on top of or adjacent to the existing video for the tuned-in channel. In some implementations, the portable program module management device 106 uses a split screen to display the existing video on one side of the split and the portable program modules on the other. In some implementations, the portable program module management device 106 overlays audio for the portable program modules onto the existing audio. The portable program module management device 106 then passes the altered audio/video on to the television programming display device 102 for presentation to the user.

In the examples above, the portable program module management device 106 is a stand-alone electronic device connected to the television programming display device 102 (and in some cases an external tuner). However, in some implementations, the portable program module management device 106 can be a component incorporated within a television programming display device or an external tuner. In general, whether the portable program module management device 106 is a stand-alone device or integrated within another device, as the television programming being displayed to the user changes, the portable program module management device 106 updates the portable program modules presented to the user.

Television programming changes can include, for example, a change in the channel, a change in the television program (e.g., the channel may remain the same, but a new television program may be presented at a particular time of day), or a change within a television program (e.g., a new guest appears on stage during a talk show television program). Updates to the portable program modules being presented can include, for example, presenting a new portable program module, no longer presenting a previously presented portable program module, or changing the content within a portable program module.

The portable program module management device 106 creates a search query 110 using the metadata from the in band and/or out of band sources. The metadata is based on the television content being displayed on the television programming display device 102. The search query 110 can include information about the television programming, such as actors and actresses shown, programming genre, closed captioning text and/or other information. The portable program module management device 106 sends the search query 110 to a search system 108 through a network 118, such as the Internet. In some implementations, the portable program module management device 106 can send the metadata to the search system 108. The search system 108 can then create the search query 110. In some implementations, the search system 108 creates and sends multiple proposed search queries to the portable program module management device 106. The portable program module management device 106 presents the proposed search queries to the user and the user can select a search query to perform. The portable program module management device 106 then sends the selected search query to the search system 108.

In response to receiving the search query 110, the search system 108 performs a search of network application data, such as web pages, gadgets, applications, or other files, accessible over the network 118. In some implementations, the search system 108 provides the results of the search to the portable program module management device 106 as search results 112. The search results 112 can include, for example, a list of portable program modules having attributes that match terms in the search query 110. The search results 112 can include a reference to a portable program module stored at a network application data provider 114. The search system 108 can order the portable program modules in the list of the search results 112 based users' ratings of the individual portable program modules, preferences of the user associated with the portable program module management device 106, and/or viewership or number of downloads for the individual portable program modules.

Alternatively, the search system 108 can provide a portable program module identified in the search results 112 to the portable program module management device 106. For example, the search system 108 can receive the portable program module from the network application data provider 114 and forward the portable program module to the portable program module management device 106.

In some implementations, the search system 108 receives and stores portable program modules prior to receiving the search query 110. This can remove an additional trip over the network 118 (to the network application data provider 114) at the time when the portable program module is provided to the portable program module management device 106.

The network application data provider 114 is a computing system, such as a web server or other network accessible computing system. The network application data provider 114 stores one or more portable program modules, including one or more of the portable programming modules listed in the search results 112. The network application data provider 114 can send a network application data 116 over the network 118 to the portable program module management device 106. For example, the network application data provider 114 can send the network application data 116 to be processed by a portable program module presented by the display device 102.

In addition to sending the search query 110 to the search system 108, the portable program module management device 106 can search data stored locally at the portable program module management device 106 using the search query 110. For example, the portable program module management device 106 can search within portable program modules that have already been downloaded and/or installed at the portable program module management device 106. The local search results can include links for opening or initiating the existing portable program modules that satisfy the search query 110. The portable program module management device 106 can also search user data at the portable program module management device 106 for portable program modules that satisfy the search query 110. For example, the portable program module management device 106 may include bookmarks or shortcut links to portable program modules and the portable program module management device 106 can search the bookmarks and/or shortcuts for portable program modules matching the search query 110. The portable program module management device 106 can, in some implementations, display local search results immediately and displays search results from the search system 108 as they arrive at the portable program module management device 106.

The portable program module management device 106 generates new search queries when the television programming shown on the television programming display device 102 changes—such as when the channel is changed, a different television program is presented, or when a change occurs within a television program.

In one example, a user is watching an instructional cooking television program called "Cooking with Sparky." In this example, the television programming provider 104 is a local public broadcasting station. The television programming display device 102 in this example is a television that receives the television programming from the portable program module management device 106 through an over-the-air transmission. The portable program module management device 106 records and stores information about the channel that is currently selected by and displayed to the user.

In some implementations, the portable program module management device 106 receives information about the specific television program that is being displayed, such as a title of the television program. For example, the portable program module management device 106 can receive electronic program guide (EPG) information from a server system over the network 118. In another example, the portable program module management device 106 can receive closed captioning (CC) information or other information within the signal or separately from the signal from the television programming provider 104 or another system. In some implementations, the EPG and CC information is retrieved from metadata in a broadcast signal, such as the metadata in the Vertical Blanking Interval or the metadata provided by the Program and System Information Protocol (PSIP). EPG metadata can include, for example, a title of the television program, a description of the television program, the channel name and/or number, and the time interval and date for the broadcast of the television program. CC metadata can include, for example, a machine generated or manual generated transcript of the television program.

In some implementations, the portable program module management device 106 can retrieve metadata for the current television program from an external source. For example, the portable program module management device 106 can use the identity of the channel and the current time and date to uniquely identify the television program. The portable program module management device 106 can then request the EPG and/or CC data from an external source, such as the search system 108 or another computing system on the network 118. Alternatively, the portable program module management device 106 can download EPG and/or CC metadata for a number of channels and television programs prior to the user selecting a channel. The portable program module management device 106 can then search for the television program in the local copy of the EPG and/or CC metadata rather than requesting the metadata at the time the user makes a selection.

Returning to the cooking show example, based on the time, date and programming information previously downloaded, the portable program module management device 106 can identify that the show being displayed is "Cooking with Sparky." The portable program module management device 106 can generate the search query 110, including terms applicable to this television program. For example, the search query 110 can include EPG information that describes the television program, such as information identifying the channel as a public broadcasting station, identifying the show as one that often features barbeque cooking, and that the show is hosted by a former stunt man named Sparky. In some implementations, the search query 110 can also include information about the user of the television programming display device 102, the hardware used to output the video, and/or other information. For example, if the viewer indicates a preference for Spanish language translations, this information can be included in the search query 110.

The portable program module management device 106 sends the search query 110 over the network 118 to the search system 108. The search system 108 performs the search query 110 on an index of portable program modules. The search results 112 include a list of portable program modules related to the television program "Cooking with Sparky" and to properties of the user or the user's system. The search system 108 sends the search results 112 to the portable program module management device 106.

In one example, the search results 112 include a portable program module that scans closed caption text for cooking measurements and displays their conversion values (such as from metric to standard units). In another example, the search results 112 include an advertising portable program module for a fund raiser held by the public broadcasting station. The search results 112 may also include a gadget that shows Sparky's entry in an online encyclopedia of movies that lists the movies in which Sparky has participated as a stunt man. In another example, the search results 112 include a translator that displays the closed captioning text translated into another language.

In some implementations, the search results 112 are sent to the network application data provider 114. The network application data provider 114 can then send the portable program module from the search results 112 to the portable program module management device 106. The portable program module management device 106 then processes the portable program modules and overlays the portable program modules on the audio/video signal passed to the television programming display device 102.

In some implementations, the television programming display device 102 can be a personal computer. For example, the television programming provider 104 can be an Internet website operated by a national broadcasting company that streams episodes of television shows. In this example, the portable program module management device 106 can be implemented as software and/or hardware in the personal computer. The viewer may be watching last week's episode of "Who Knows how to Cook?," which is a reality television show where contestants battle in a culinary tournament to win a restaurant. The portable program module management device 106 generates the search query 110 based on metadata about the show. The search query 110 includes information identifying the show as a reality television show, that the current episode features barbeque cooking, and that the show is hosted by famous restaurateur Chef Emanuel. The portable program module management device 106 sends the search query 110 to the search system 108. The search system 108 processes the search query 110 to identify a list of portable program modules having information that matches the search terms in the search query 110 (e.g., gadgets and/or applications related to reality television, barbeque cooking, and/or Chef Emanuel).

For example, the search system 108 can identify a chat program able to connect the user with a chat room filled other people currently watching "Who Knows how to Cook?" The search system 108 can identify the gadget that scans closed captioning text for cooking measurements and displays their converted values. The search system 108 can identify a web page of a restaurant near the user that is owned and operated by Chef Emanuel. The search system 108 sends the list of portable program modules to the portable program module management device 106 in the search results 112. In some implementations, the search system 108 sends links to the portable program modules, such as a Uniform Resource Identifier (URI). The portable program module management device 106 can use the URI information in the search results 112 to request portable program modules from the network application data providers 114 that host one or more of the portable program modules. In some implementations, the search system 108 sends the portable program modules themselves without requiring the portable program module management device 106 to send a request to retrieve the portable program modules.

Figure 2:
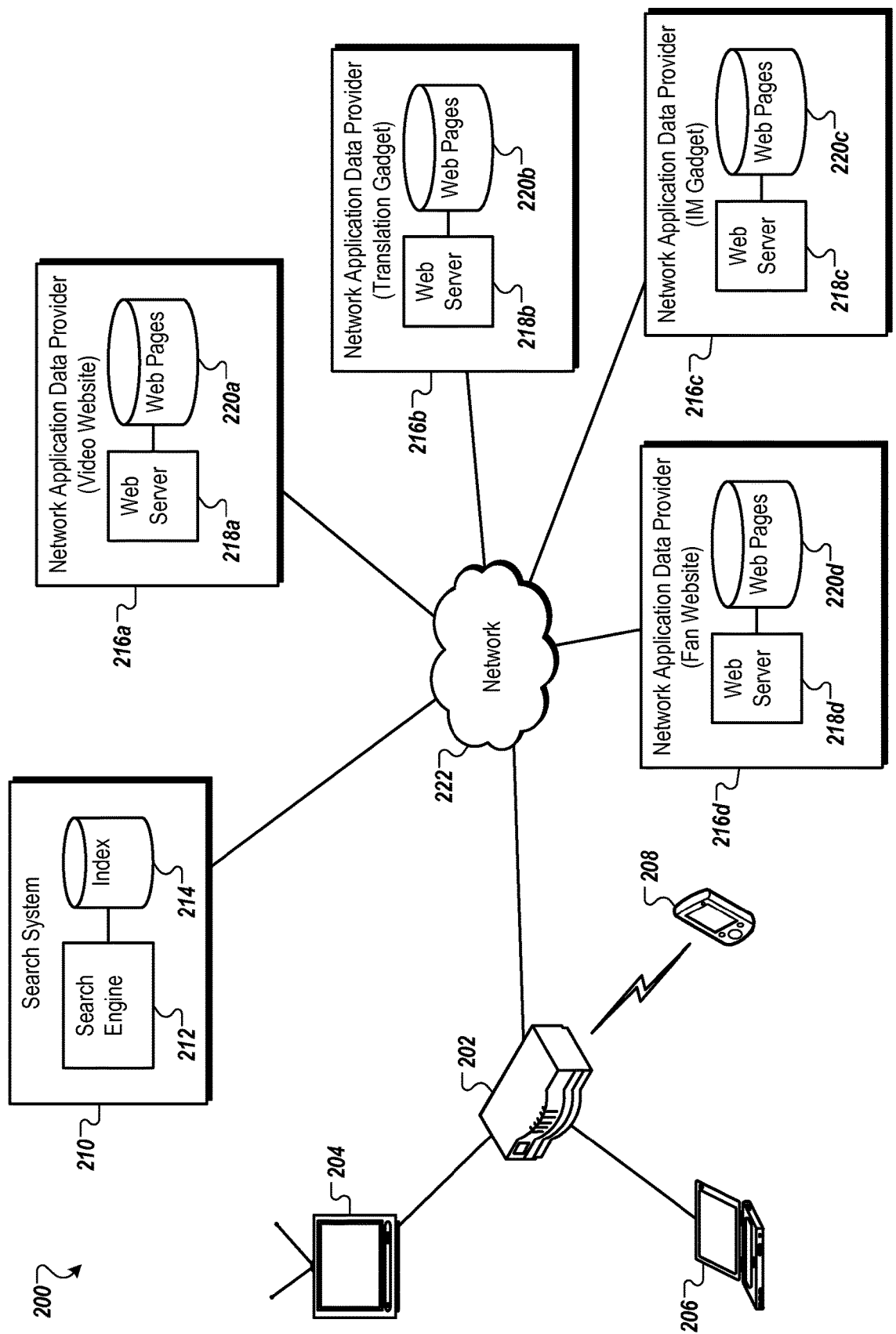
FIG. 2 is a schematic diagram that shows an example of a system for managing the lifecycle of television portable program modules.

FIG. 2 is a schematic diagram that shows an example of a system 200 for managing the lifecycle of television portable program modules. The system 200 includes a portable program module management device 202 in wire line or wireless communication with a television 204, a personal computer 206, and a wireless video player 208. The television 204, the personal computer 206, and the wireless video player 208 present audio/video data received from the portable program module management device 202, including output from one or more portable program modules that the portable program module management device 202 can overlay on the audio/video data. Other systems including more or fewer video playback devices and similar or different types are also possible. The portable program module management device 202 is also in communication with a search system 210 and one or more network application data providers 216a-d over a network 222, such as the Internet.

The search system 210 includes a search engine 212 that processes search queries generated by the portable program module management device 202. For example, the search engine 212, or another module or server, may crawl the network 222 to identify portable program modules that are available from the network application data providers 216a-d over the network 222. Alternatively, the network application data providers 216a-d or other systems can provide information about available portable program modules, such as links to the network application data providers 216a-d. In another example, the network application data providers 216a-d can upload applications to the search system 210 for download by the portable program module management device 202 or the portable program module management device 202 can retrieve portable program modules directly from the network application data providers 216a-d. In some implementations, the search system 210 provides an app store where applications can be purchased and then downloaded for use by a device, such as the portable program module management device 202.

The search system 210 stores the portable program module information in an index 214. The index 214 can include information such as a name, keywords, a television channel number, a television channel name, a television program name, a time of day, a network address, or other information associated with each portable program module. In some implementations, the index 214 includes a copy of the portable program module allowing the search system 210 to send the portable program module directly to the portable program module management device 202.

The network application data providers 216a-d are computing systems that provide access to one or more portable program modules over the network 222. The network application data providers 216a-d include respective web servers 218a-d and one or more web pages 220a-d. The web servers 218a-d process incoming and outgoing communications. The web servers 218a-d provide interactivity with the web pages 220a-d. The web pages 220a-d include data and/or content that are shown in the portable program modules. While some of the web pages 220a-d may be in a format able to be presented directly by a web browser, such as HTML, some image formats, and JavaScript, other data types may be presented within the browser using plug-ins, such as Java or Flash media.

In one example, the television 204 connected to the portable program module management device 202 shows the "Cooking with Sparky" television program. The portable program module management device 202 can use information from the search system 210 to identify a translation portable program module from the network application data provider 216b. The portable program module management device 202 communicates with the web server 218b to request the translation portable program module from the web pages 220b.

In another example, the personal computer 206 (e.g., in another room of the same house as the television 204) shows the "Who Knows how to Cook?" television program. The portable program module management device 202 can use information from the search system 210 to identify a fan website portable program module from the network application data provider 216d. The portable program module management device 202 communicates with the web server 218d to request the fan page for the "Who Knows how to Cook?" television program.

Figure 3:
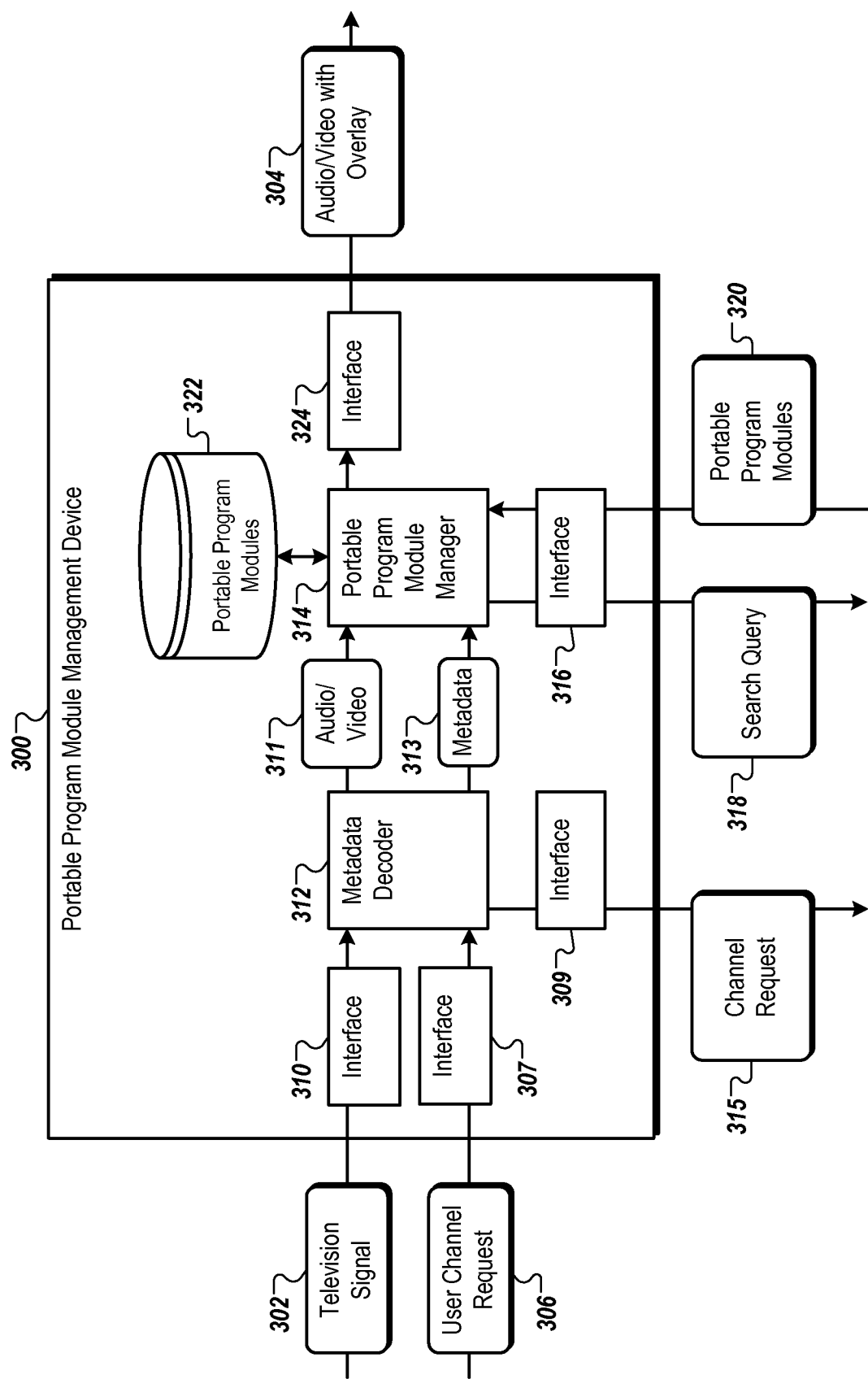
FIG. 3 is a block diagram that shows an example of a portable program module management device.

FIG. 3 is a block diagram that shows an example of a portable program module management device 300. The portable program module management device 300 accepts inputs, such as a television signal 302 through an interface 310 and a user channel request 306 through an interface 307. For example, the interface 310 can be a hardware interface such as a consumer electronics video connection. The interface 307 can be a hardware interface, such as a wireless infrared receiver for a remote control, a wire line network connection to a computing device, or a button on the portable program module management device 300 itself.

The portable program module management device 300 can receive an audio/video signal for a television channel that has already been tuned by a tuner that is external to the portable program module management device 300. For example, the portable program module management device 300 can receive the user channel request 306 and forward a channel request 315 on to the external tuner through an interface 309. The interface 309 may be a consumer electronics connection, such as an HDMI connection or an IR connection. The portable program module management device 300 then receives the television signal 302 from the external tuner for the channel that was requested in the channel request 315. In some implementations, the interface 310 and the interface 309 can be colocated or a single interface, such as in an HDMI connection.

As an alternative to an external tuner, the portable program module management device 300 may include a tuner. The portable program module management device 300 uses the tuner and the user channel request 306 to tune in an audio and video signal 311 for a particular television channel. For example the portable program module management device 300 can include an Advanced Television Systems Committee (ATSC) tuner, a National Television Systems Committee (NTSC) tuner, a Sequential Color with Memory (SECAM) tuner, a Phase Alternating Line (PAL) tuner, and/or a Digital Video Broadcasting (DVB) tuner. The tuner can allow the portable program module management device 300 to tune one or more of over the air broadcast television channels, cable television channels, satellite television channels, or channels provided by a telecommunications/telephone company.

In addition to live broadcast by an internal or external tuner, the portable program module management device 300 can receive and/or retrieve recorded television programming or video on demand. In addition to video programming, the portable program module management device 300 can receive audio channels or radio as the input signal.

The portable program module management device 300 includes a metadata decoder 312 that decodes metadata from the television signal 302. For example, the metadata decoder 312 can decode certain metadata 313 from the television signal 302, such as call letters for the television channel, the name of the television program, closed captioning text of the television program, or other metadata included in the television signal 302. The metadata decoder 312 provides the audio and video signal 311 for the television program and the metadata 313 for the television program to a portable program module manager 314. In some implementations, the portable program module manager 314 receives in band metadata if the interface 309 and/or the interface 310 are analog interfaces.

In some implementations, the metadata 313 provided to the portable program module manager 314 is general purpose information that is not specifically designed to be a trigger for portable program modules. For example, this may allow the portable program module manager 314 to be used with general purpose television programming systems rather than a special purpose television programming provider system specifically designed for portable program module management.

In some implementations, the portable program module manager 314 can receive out of band metadata through an interface 316. For example, the interface 316 can be a network connection to a local area network or the Internet. The portable program module manager 314 can use, for example, a channel identifier, a time of day and date, and television programming provider head end information (e.g., a name of the provider and/or a location of the portable program module management device 300) to access or retrieve EPG data, transcript data, or other out of band programming data related to the television signal 302. In some implementations, the portable program module manager 314 receives out of band metadata through the interface 316 if the interface 309 and/or the interface 310 are digital interfaces.

The portable program module manager 314 generates a search query 318 based on the metadata 313 and/or any out of band metadata. The portable program module manager 314 sends the search query 318 to a remote computing system through the interface 316. In some implementations, the interface 316 can be a network interface to the Internet, an intranet, or other computer network.

The remote computing system processes the search query 318 to identify one or more portable program modules 320. The remote computing system sends the portable program modules 320 to the portable program module manager 314. In some implementations, the portable program module manager 314 stores the portable program modules 320 in a portable program module storage 322. In some implementations, the portable program module storage 322 is a persistent memory, such as a database in a hard drive or flash memory device. In some implementations, the portable program module storage 322 is a non-persistent memory, such as random access memory (RAM). The portable program module manager 314 can also use the search query 318 to search the portable program module storage 322 for portable program modules that have already been downloaded and/or installed at the portable program module management device 300.

In some implementations, where the portable program module manager 314 receives multiple portable program modules, the portable program module manager 314 presents a list of the portable program modules to the user and allows the user to select one or more of the portable program modules for display. In some implementations, the portable program module manager 314 selects a predetermined number of the portable program modules resulting from the search (such as the first one, two, or three portable program modules) for display and provides an option that allows the user to select one or more of the additional portable program modules for display. In some implementations, the portable program module manager 314 selects all of the portable program modules resulting from the search for display on the television device. In another example, the portable program module manager 314 selects enough portable program modules to fill the space available on the display device and can also provide a user input control to request the display of additional portable program modules. In another example, the portable program module manager 314 can hide or disable a portable program module that has not been used or has been inactive for a threshold amount of time to provide space for other portable program modules.

The portable program module manager 314 combines the audio and video signal 311 with one or more of the portable program modules 320. For example, the portable program module manager 314 can overlay the audio and visual data from the portable program modules 320 on top of the corresponding components of the audio and video signal 311 to produce an audio and video signal with portable program module overlay 304. The portable program module manager 314 outputs the audio and video signal with portable program module overlay 304 through an interface 324 to a device such as the television programming display device 102, the television 204, the personal computer 206, or the wireless video player 208. In some implementations, the interface 324 includes one or more consumer electronics audio/video hardware interfaces, such as High-Definition Multimedia Interface (HDMI), Digital Visual Interface (DVI), component video, composite video, Video Graphics Array (VGA) D-subminiature (DSUB), S/PDIF digital audio (e.g., over coaxial cable or optical fiber, such as TOSLINK), and/or analog audio.

In some implementations, the portable program module manager 314 outputs the audio and video signal with portable program module overlay 304 over a network interface, such as the interface 316. In addition, the portable program module manager 314 can convert the audio and video signal with portable program module overlay 304 to a compressed format, such as the MPEG-2 format or the H.264 format. The portable program module manager 314 can then send the compressed signal to a computing device on the local area network with the portable program module manager 314 or to a remote computing device, such as a device connected to the portable program module manager 314 through the Internet.

Over time the metadata decoder 312 sends updates of the metadata 313 to the portable program module manager 314. For example, if the user inputs a new channel request, the metadata decoder 312 or the interface 307, can pass the new channel identifier to the portable program module manager 314.

In another example, if metadata within the television signal 302 indicates that a previous television program has ended and another television has begun, then the metadata decoder 312 can send the television program status updates to the portable program module manager 314. In another example, the portable program module manager 314 can determine that a television program has ended and a new television program has begun based on the current channel identifier in the metadata 313 and EPG metadata. In some implementations, the portable program module manager 314 retrieves the EPG metadata at runtime from an external source. In some implementations, the portable program module manager 314 retrieves the EPG metadata at some time prior to managing the portable program modules and stores the EPG metadata in a storage device, such as the portable program module storage 322.

In another example, the metadata decoder 312 can send continuous metadata updates to the portable program module manager 314, such as in the case of closed captioning text. As the metadata decoder 312 decodes the closed captioning text from the television signal 302, the metadata decoder 312 sends the closed captioning text to the portable program module manager 314.

The portable program module manager 314 uses the metadata 313 to manage the life cycle of the portable program modules currently being displayed in the audio and video signal with portable program module overlay 304. For example, if the user changes the channel, the channel change is reflected in the metadata 313 and the portable program module manager 314 can perform a new search query using the new channel and EPG information associated with the current time and the new channel. In one example, if the portable program module manager 314 is currently displaying a portable program module that is no longer included in the new search results, then the portable program module manager 314 can remove the portable program module from the audio and video signal with portable program module overlay 304. In some implementations, the portable program module manager 314 prompts the user to accept the removal of the portable program module that no longer satisfies the search query.

In some implementations, the portable program module manager 314 publishes data to which the portable program modules being displayed can subscribe. For example, the portable program module manager 314 can publish the metadata 313 from the metadata decoder 312 or the out of band metadata. In another example, the portable program module manager 314 can publish text or objects recognized from the video in the television signal 302 and/or text recognized from the audio in the television signal 302. In some implementations, the text and/or object recognition of the video or audio can be performed by a remote system. In another implementation, the portable program module manager 314 can perform text and/or object recognition of the video or audio.

A portable program module can subscribe to a stream including the published data. The portable program module can then use the published data, such as in translating text into another language. In another example, the portable program module manager 314 can publish other television programming related information, such as an identifier of the channel or television program being presented.

In some implementations, the portable program module manager 314 can publish information related to the user, such as a location of the user (e.g., a city or postal code), television program viewing preferences of the user, or other user information. In some implementations, the portable program module manager 314 only publishes user information upon request by the user. For example, the portable program module manager 314 can prompt the user for confirmation each time a portable program module requests subscription to user information or other information. In another example, the portable program module manager 314 can apply a confirmation to all portable program modules or a group of portable program modules, such as a group from the same Internet domain or from the same author.

Figure 4:
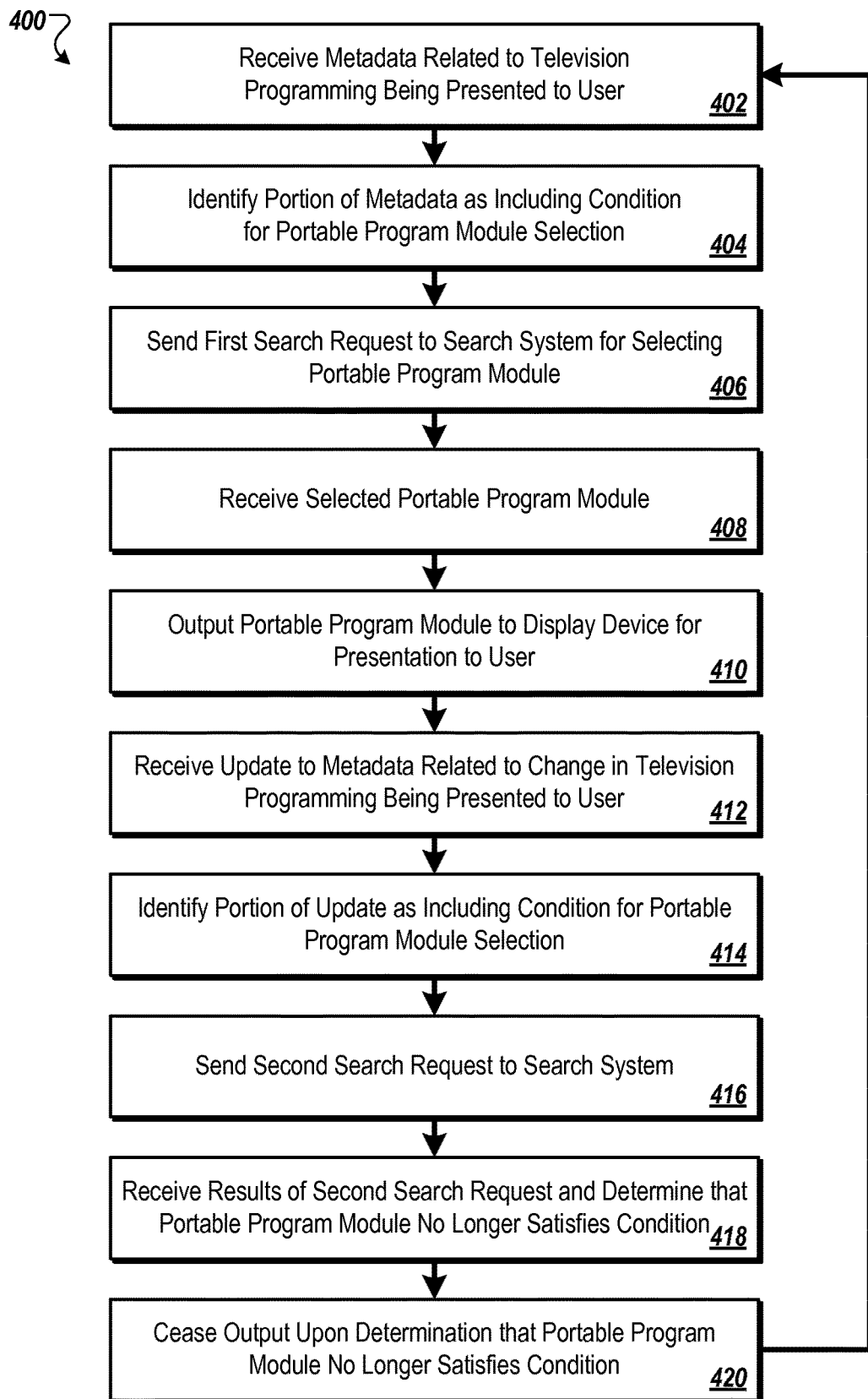
FIG. 4 is a flow chart that shows an example of a process for managing the lifecycle of television portable program modules.

FIG. 4 is a flow chart that shows an example of a process 400 for managing the lifecycle of television portable program modules. The process 400 may be performed, for example, by a system such as the systems 100 and 200, and the portable program module management device 300. For clarity of presentation, the description that follows uses the systems 100 and 200, and the portable program module management device 300 as the basis of examples for describing the process 400. However, another system, or combination of systems, may be used to perform the process 400. The process 400 begins with receiving (402) metadata related to television programming being presented to a user. For example, the portable program module management device 106, the portable program module management device 202, and/or the portable program module management device 300 can receive metadata, such as the current channel, EPG data, or closed captioning text, from sources such as the metadata decoder 312 and/or the search system 108, the search system 210, or another remote server.

The process 400 identifies (404) a portion of the received metadata as including information regarding a condition for portable program module selection. For example, the portable program module management device 106, the portable program module management device 202, and/or the portable program module management device 300 can identify a time and date, a program identifier or name, closed captioning information, a channel identifier or name, actor and/or actress names, and/or a genre of the television program being presented.

The process 400 sends (406) a first search request that includes the identified portion of the received metadata to a search system for selecting one or more portable program modules from among multiple portable program modules, where the selected portable program modules satisfy the condition. For example, the portable program module management device 106, the portable program module management device 202, and/or the portable program module management device 300 can send a search query, including metadata related to the television program currently being presented, to the search systems 108 and 210. The search systems 108 and 210 match portable program modules to one or more points of information from the metadata, such as a stock ticker for a financial news show, or a chat program for an evening drama aimed at teenagers. In some examples, the search results may include more portable program modules that satisfy the condition based on the information in the identified portion of the received metadata than can be selected. In these cases, the portable program modules selected can be based on one or more criteria, including portable program modules previously selected by the user or other users, portable program modules shown to other viewers of the same television content, and/or other ranking, such as links to a portable program module.

The process 400 receives (408) the selected portable program module. For example, the portable program module management device 106, the portable program module management device 202, and/or the portable program module management device 300 can receive the selected portable program module from the search system 108 or the search system 210. Alternatively, the portable program module management device 106, the portable program module management device 202, and/or the portable program module management device 300 can receive a link or URL to the selected portable program module from a search system and then use the link or URL to retrieve the selected portable program from a network application data provider.

The process 400 outputs (410) the selected portable program module to a display device for presentation to the user concurrently with the presentation of the television programming. For example, the portable program module management device 202 can output an audio signal and a video signal, which include an overlay for one or more selected portable program modules, to a presentation device, such as the television 204, the personal computer 206, and the wireless video player 208. In some implementations, the portable program module management device 202 outputs the audio signal to a first device (e.g., a sound system) and the video signal to a second device (e.g., a video system).

The process 400 receives (412) an update to the metadata related to a change in the television programming being presented to the user. For example, the portable program module management device 300 can receive the television signal 302 and/or the user channel request 306. The metadata decoder 312 can decode the television signal 302 and/or the user channel request 306 to identify a change in the television programming being presented to the user, such as a change between television programs on the same channel, a change between channels, or a change within a television program. The portable program module manager 314 receives the identified change in an update to the metadata.

The process 400 identifies (414) a portion of the received update as including information regarding the condition for portable program module selection. For example, the portable program module manager 314 can identify a channel identifier, television program identifier, or other information, such as a transcript of the television program or a name of an actor.

The process 400 sends (416) a second search request that includes the identified portion of the received update to the search system. For example, the portable program module management device 106 can send a search query to the search system 108. The search query includes the metadata related to the television program currently presented to the user, such as a channel identifier, a television program identifier, or other metadata related to the television program.

The process 400 receives (418) results of the second search request and based on the results determines that the portable program module being presented to the user no longer satisfies the condition based on the information in the identified portion of the received update. For example, the portable program module manager 314 can compare a list of the portable program modules that are currently included in the audio/video overlay to a list of portable program modules in the search results from the search system. If a portable program module is no longer included in the search results, then the portable program module no longer satisfies the search condition. For example, if a fund raising portable program module is displayed while a local public television program is playing, a change to a national broadcast channel could cause the fund raising portable program module to no longer satisfy the channel search condition. In some implementations, the portable program module manager 314 can prompt the user to confirm the removal of the portable program modules that no longer satisfy the conditions in the search query.

The process 400 ceases (420) the output of the portable program module upon the determination that the portable program module no longer satisfies the condition. For example, in the above example, the fund raising portable program module can be terminated. In some implementations, the portable program module manager 314 can add another portable program module that does satisfy the search condition to the resulting space created by removing the fund raising portable program module. The process 400 can repeat one or more steps. For example, the process can receive (402) metadata again. In some implementations, one or more steps can be performed concurrently. For example, the process 400 can receive (402) metadata that results in the display of a first portable program module and receive (412) a metadata update that results in ceasing the output of a second portable program module.

Figure 5:
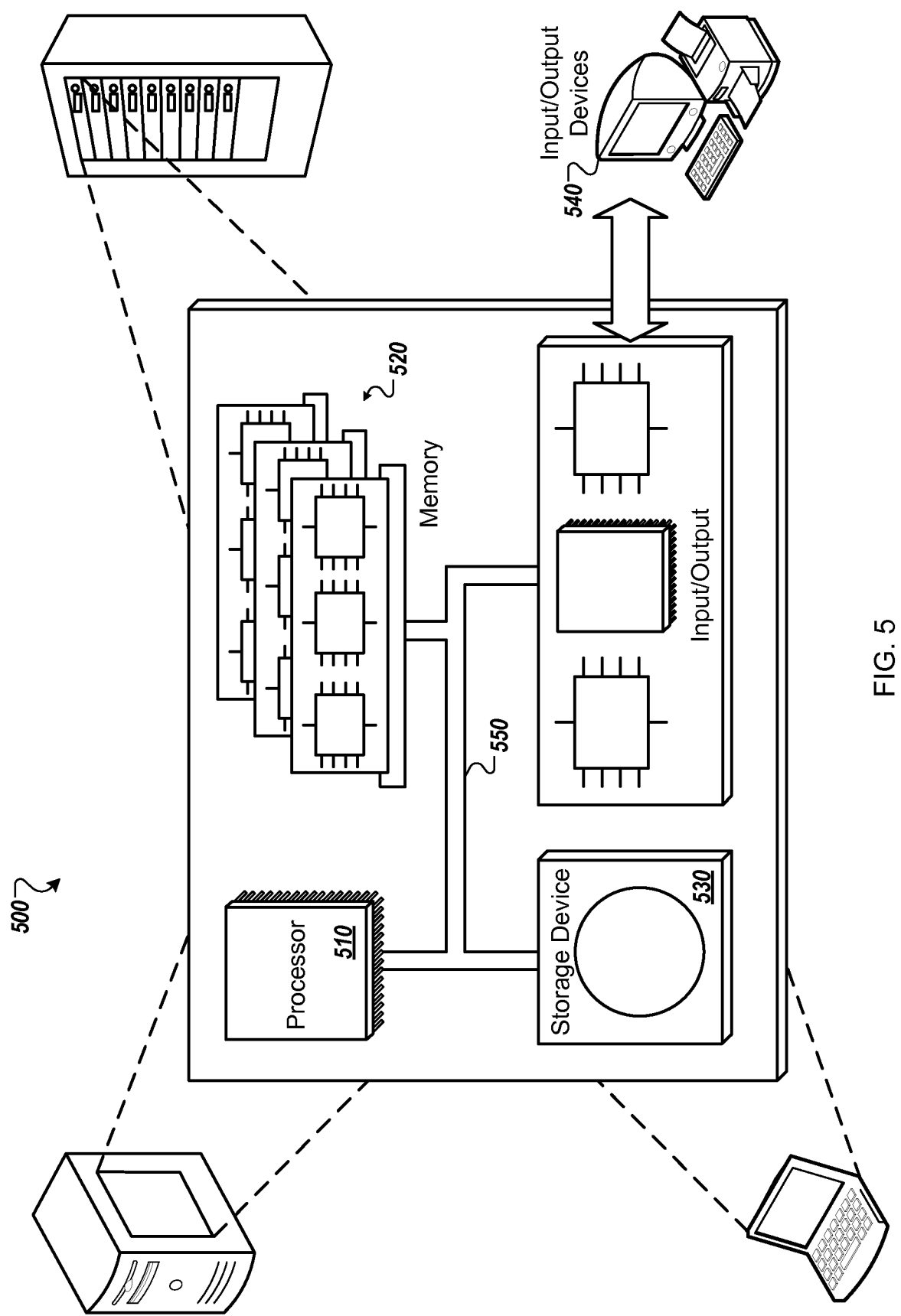
FIG. 5 is a schematic diagram that shows an example of a computing system.

FIG. 5 is a schematic diagram that shows an example of a computing system 500. The computing system 500 can be used for the operations described in association with any of the computer-implement methods and systems described previously, according to some implementations. The computing system 500 includes a processor 510, a memory 520, a storage device 530, and an input/output device 540. Each of the processor 510, the memory 520, the storage device 530, and the input/output device 540 are interconnected using a system bus 550. The processor 510 is capable of processing instructions for execution within the computing system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the computing system 500. In some implementations, the memory 520 is a computer-readable medium. In some implementations, the memory 520 is a volatile memory unit. In some implementations, the memory 520 is a non-volatile memory unit.

The storage device 530 is capable of providing mass storage for the computing system 500. In some implementations, the storage device 530 is a computer-readable medium. In various different implementations, the storage device 530 may be a floppy disk device, a hard disk device, an optical disk device, or a tape device.

The input/output device 540 provides input/output operations for the computing system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a backend component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method for managing a lifecycle of portable program modules, the method comprising:
    causing, using a computing device that includes a hardware processor, a representation of a first application to be presented, wherein the first application is related to a first object identified in a first media content item that is currently being presented;
    determining that the first media content item being presented has changed to a second media content item; and
    causing the representation of the first application to cease being presented and replacing the representation of the first application with a second application that is related to a second object identified in the second media content item being presented.

2. The method of claim 1, further comprising determining that a first plurality of applications related to the first media content item that is being presented, which includes the first application, is available for download on the computing device.

3. The method of claim 1, further comprising determining that a second plurality of applications related to the second media content that is being presented, which includes the second application, is available for download on the computing device.

4. The method of claim 1, further comprising determining that the first application does not relate to the second media content item being presented.

5. The method of claim 1, further comprising:
    determining first metadata related to the first media content item being presented;
    sending a first search request that includes at least a portion of the first metadata to a search system; and
    in response to the first search request, receiving first search results from the search system that identifies the first application, wherein the first application corresponds to the first metadata.

6. The method of claim 1, further comprising:
    determining second metadata related to the second media content item being presented;
    sending a second search request that includes at least a portion of the second metadata to the search system; and
    in response to the second search request, receiving second search results from the search system indicating that the first application is not related to the second media content item and that the second application is related to the second media content item.

7. The method of claim 1, further comprising:
    extracting captioning information from the first media content item being presented;
    transmitting a query to an application source that includes a plurality of applications, wherein the query includes at least a portion of the extracted captioning information; and
    receiving the representation of the first application based on the query.

8. The method of claim 1, wherein the first media content item and the second media content item are presented on a presentation device that is associated with the computing device.

9. The method of claim 1, further comprising:
    determining first metadata related to the first media content item being presented; and
    searching through locally stored applications on the computing device for the first application that has been installed on the computing device.

10. A system for managing a lifecycle of portable program modules, the system comprising:
    a memory; and
    a hardware processor that, when executing computer-executable instructions stored in the memory, is configured to:
        cause a representation of a first application to be presented, wherein the first application is related to a first object identified in a first media content item that is currently being presented;
        determine that the first media content item being presented has changed to a second media content item; and
        cause the representation of the first application to cease being presented and replacing the representation of the first application with a second application that is related to a second object identified in the second media content item being presented.

11. The system of claim 10, wherein the hardware processor is further configured to determine that a first plurality of applications related to the first media content item that is being presented, which includes the first application, is available for download on the computing device.

12. The system of claim 10, wherein the hardware processor is further configured to determine that a second plurality of applications related to the second media content that is being presented, which includes the second application, is available for download on the computing device.

13. The system of claim 10, wherein the hardware processor is further configured to determine that the first application does not relate to the second media content item being presented.

14. The system of claim 10, wherein the hardware processor is further configured to:
   determine first metadata related to the first media content item being presented;
   send a first search request that includes at least a portion of the first metadata to a search system; and
   in response to the first search request, receive first search results from the search system that identifies the first application, wherein the first application corresponds to the first metadata.

15. The system of claim 10, wherein the hardware processor is further configured to:
   determine second metadata related to the second media content item being presented;
   send a second search request that includes at least a portion of the second metadata to the search system; and
   in response to the second search request, receive second search results from the search system indicating that the first application is not related to the second media content item and that the second application is related to the second media content item.

16. The system of claim 10, wherein the hardware processor is further configured to:
   extract captioning information from the first media content item being presented;
   transmit a query to an application source that includes a plurality of applications, wherein the query includes at least a portion of the extracted captioning information; and
   receive the representation of the first application based on the query.

17. The system of claim 10, wherein the first media content item and the second media content item are presented on a presentation device that is associated with the computing device.

18. The system of claim 10, wherein the hardware processor is further configured to:
   determine first metadata related to the first media content item being presented; and
   search through locally stored applications on the computing device for the first application that has been installed on the computing device.

19. A non-transitory computer-readable medium containing computer-executable instructions that, when executed by a processor, cause the processor to perform a method for managing a lifecycle of portable program modules, the method comprising:
   causing a representation of a first application to be presented, wherein the first application is related to a first object identified in a first media content item that is currently being presented;
   determining that the first media content item being presented has changed to a second media content item; and
   causing the representation of the first application to cease being presented and replacing the representation of the first application with a second application that is related to a second object identified in the second media content item being presented.

* * * * *